United States Patent [19]

Hege

[11] E Re. 28,755

[45] Reissued Apr. 6, 1976

[54] SEALED SILO FILLING LID

[76] Inventor: Sanford L. Hege, R.R. 1, Fayetteville, Pa. 17222

[22] Filed: Apr. 28, 1975

[21] Appl. No.: 572,470

Related U.S. Patent Documents

Reissue of:

[64] Patent No.: 3,733,764
Issued: May 22, 1973
Appl. No.: 209,713
Filed: Dec. 20, 1971

[52] U.S. Cl. ..... 52/192; 49/347; 49/357; 220/262; 220/334

[51] Int. Cl.[2] ..... E04H 7/22

[58] Field of Search ..... 52/192, 72, 195, 68, 196, 52/69; 49/357, 347, 386, 387; 220/20.5, 262, 334; 222/508, 503

[56] References Cited

UNITED STATES PATENTS

| | | | |
|---|---|---|---|
| 952,133 | 3/1910 | Norquist | 52/192 |
| 1,046,456 | 12/1912 | Freeland | 52/196 |
| 1,381,630 | 6/1921 | Goodrich | 49/347 X |
| 1,606,621 | 11/1926 | Fischer | 49/357 X |
| 2,835,269 | 5/1958 | Seymour | 222/508 X |

*Primary Examiner*—Alfred C. Perham
*Attorney, Agent, or Firm*—Andrus, Sceales, Starke & Sawall

[57] ABSTRACT

The filling lid for sealed silos has a base plate adapted to close an inlet in the silo roof, the base plate having an opening therethrough registering with the silo inlet. A filling hopper is provided on the base plate around the opening, the hopper being open at its top to receive the usual gooseneck of a silage blower. A closure plate is hingedly mounted on the underside of the base plate adapted in operative position to cover the opening in said base plate in an airtight manner. Linkage is provided for swinging the closure plate into operative position, including a bell crank lever pivoted on the side of the hopper having one arm disposed substantially vertically when the closure plate is normally hanging freely in inoperative position. The other arm of the bell crank lever extends downwardly and rearwardly and is pivotally connected to the upper end of a link extending downwardly through a slot in the base plate with its other end pivoted to the closure plate. And a cable extends from the first arm of the bell crank lever across the silo roof and down the side of the silo and is adapted to be locked when the cable is drawn taut, thereby maintaining the closure plate in operative position.

4 Claims, 3 Drawing Figures

INVENTOR
SANFORD L. HEGE

BY Alexander Stoll

SEALED SILO FILLING LID

Matter enclosed in heavy brackets [ ] appears in the original patent but forms no part of this reissue specification; matter printed in italics indicates the additions made by reissue.

DESCRIPTION OF INVENTION

This invention relates to sealed silo filling lids, and the principal object is to provide a lid of the above type adapted to be mounted on the top or roof of a sealed silo, the same consisting of a base plate adapted to be mounted in an airtight manner over a filling inlet in the top of the silo roof, the base plate carrying a filling hopper open at the top to receive the outer end of the gooseneck of a blower which discharges silage into the hopper, the bottom of the hopper opening through the base plate into the top of the silo. The bottom of the base plate carries a hinged closure plate for closing the opening in the bottom of the hopper in an airtight manner after the silo has been filled, the hinged closure plate being operated by linkage pivoted on the hopper. Said linkage is controlled by a cable adapted to extend from the operating lever of the linkage across the top of the silo and down the side thereof, the lower end of the cable being attached to the customary lever on the side of the silo normally disposed 4 or 5 feet above ground, so that when the customary lever at the bottom of the silo is released the closure plate of the hopper will be open to permit filling of the silo, but when the customary lever is locked and the cable taut the closure plate of the hopper will remain tightly closed across the opening in the bottom of the hopper.

My novel sealed silo filling lid thus obviates the necessity of the farmer having to climb to the top of the silo to open the hopper each time he wants to fill the silo.

I will explain the invention with reference to the accompanying drawing, which illustrates one practical embodiment thereof, to enable others familiar with the art to adopt and use the same; and will summarize in the claims the novel features of construction, and novel combinations of parts, for which protection is desired.

Figure 1:
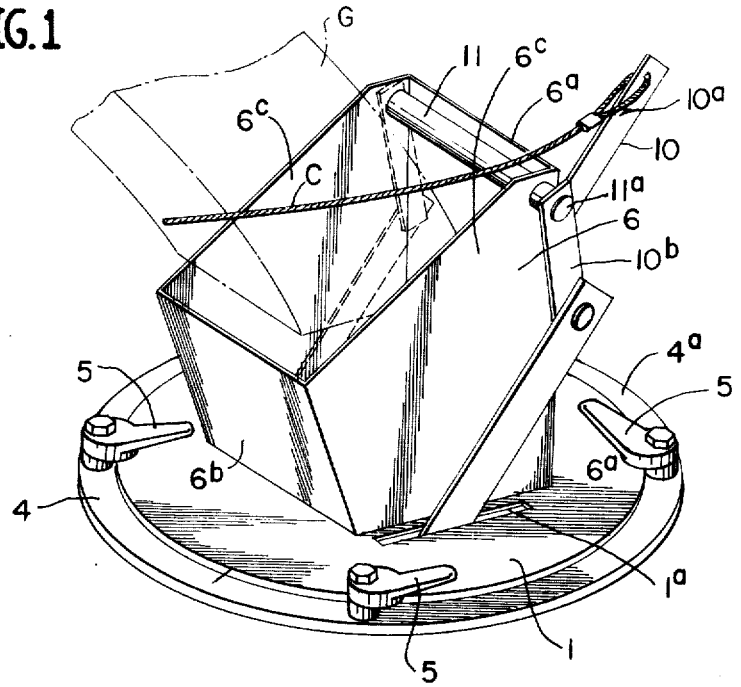
FIG. 1 is a perspective view of my novel sealed silo filling lid, detached.

As shown in the drawing, my novel sealed silo filling lid comprises a circular or other shaped base plate 1 adapted to be placed over an opening 2 in the roof of a sealed silo 4, said plate being of smaller diameter than the rim 4a (FIG. 1) of the opening 2, and the rim preferably carrying cam lugs 5 adapted in clamped position to overlie the periphery of the base plate 1 and to secure same in an airtight manner to the rim 4a of the roof 3, the particular means for securing the plate to the rim 4a forming no part of my present invention.

Plate 1 has at its central portion a rectangular or other shaped opening 5; and mounted on the plate 1 communicating with the opening 5 is a hopper 6 of substantially rectangular plan having a relatively tall back wall 6a which is substantially perpendicular to the plate 1, and having a shorter front wall 6b disposed at an outwardly and upwardly flaring angle to the base plate 1, and having side walls 6a, the upper edge of the side walls 6c sloping downwardly from substantially the top of the back wall 6a to the top of the front wall 6b, as shown in the drawing. In this manner the opening at the top of the hopper 6 is disposed at an agngle to the base plate 1 rendering it easy to insert into the opening the gooseneck G of a silage blower, as shown in dot-and-dash lines in FIG. 1, the outer end of the gooseneck terminating somewhat above the opening 5 in base plate 1.

Figure 2:
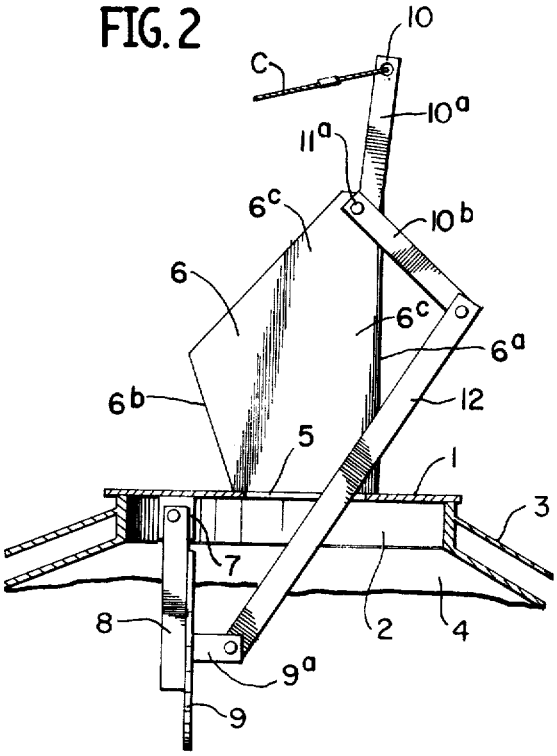
FIG. 2 is a side elevation thereof showing the filling lid secured upon the silo roof, and showing the closure plate in "open" position to permit filling of the silo by the gooseneck of the silage blower.
Figure 3:
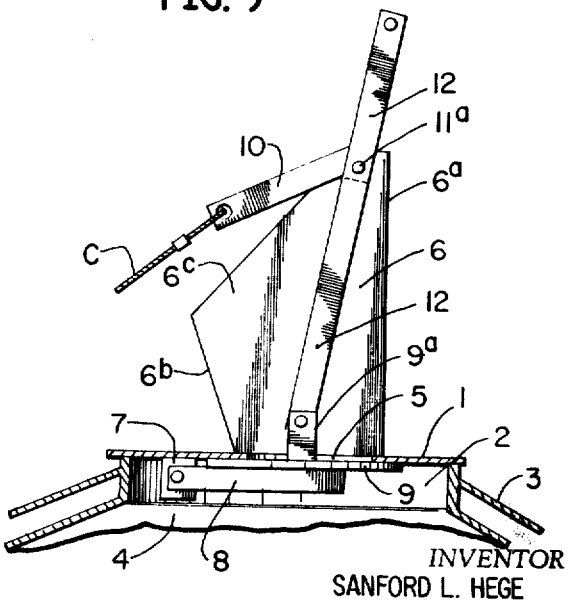
FIG. 3 is a view similar to FIG. 2, but showing the closure plate in the hopper in "closed" position.

On the underside of the base plate 1 is a block 7 (FIGS. 2 and 3) on which is pivoted an arm 8 which carries a closure plate 9 of substantially the same shape, but larger than the opening 5, whereby when the arm 8 is swung parallel with the base plate 1, as shown in FIG. 3, the closure plate 9 will close in an airtight manner the opening 5 at the bottom of hopper 6. However, when the arm 8 is swung vertically downwardly as shown in FIG. 2, the opening 5 in the bottom of hopper 6 will be fully opened to permit flow of silage from gooseneck G into the silo 4.

In order to control the swinging of the arm 8, a bell crank lever 10 is provided which is pivoted at its heel on the projecting end 11a of a shaft 11 journaled in the side walls 6c of hopper 6 adjacent and parallel with the upper edge of the back wall 6a, shown in FIG. 1. The arm 10a of the bell crank lever 10 normally extends upwardly, substantially vertically, when the cover plate 5 is in open position shown in FIG. 2, while the other arm 10b of the bell crank lever 10 extends downwardly and rearwardly, as shown in FIG. 2. To the outer end of the arm 10a is attached a cable C adapted to normally pull the arm 10a forwardly and downwardly, thereby raising the arm 10b of the bell crank lever 10. To the outer end of the arm 10b is attached the upper end of a link 12 which passes at an angle downwardly and forwardly through a slot 1a (FIG. 1) in the base plate 1 disposed beside the adjacent wall 6c of the hopper 6, the lower end of the link 12 being pivoted on a lug 9a which is secured to the center of the closure plate 9, as shown in FIGS. 2 and 3.

The cable C from the bell crank lever 10 would normally extend to the side of the silo roof 4 and down the silt to the customary lever (not shown) which is mounted on the side of the silo and disposed 4 or 5 feet above ground level, the lever having means to lock the customary lever in lowered position.

In operation, when the lever at the bottom of the silo is in unlocked position the cable C will remain untaut and the weight of the closure plate 9 would cause the closure plate to assume a substantially vertical position as shown in FIG. 2, in which the opening 5 in base plate 1 was uncovered, thus permitting silage to enter the top of the silo, the same being blown through the gooseneck G inserted in the hopper 6 in the usual manner. However, when the silo has been filled with silage and the gooseneck G removed from the hopper, it is only necessary for the farmer to pull the customary lever (not shown) downwardly at the bottom of the silo, thereby tensioning the cable C and actuating the bell crank lever 10 into the position shown in FIG. 3, in which position the closure plate 9 will have been raised into position parallel with base plate 1 to close the opening 5 therein, as shown in FIG. 3, and in which position the leg 10b of the bell crank lever would substantially underlie the link 12 in parallel relation thereto, as shown in FIG. 3. Of course, the customary lever at the side of the silo would be locked in lowered position to prevent release of tension on cable C, thus maintaining the substantially sealed atmosphere within the silo.

The above construction obviates the necessity of the farmer having to climb to the top of the silo to open the lid in the top thereof each time he wishes to fill the silo.

I claim:

1. A filling lid for sealed silos comprising, a base plate adapted to close a silage inlet in the silo roof, said base plate having an opening therethrough registering with said inlet; a filling hopper on said base plate around said pening, said hopper being open at its top to receive the usual gooseneck of a silage blower; a closure plane hingedly mounted on the underside of the base plate adapted in operative position to cover the opening in said base plate in an airtight manner; linkage for swinging the closure plate into operative position, said linkage comprising a bell crank lever pivoted on the hopper having one arm disposed substantially vertically when the closure plate is normally hanging freely in inoperative position; the other arm extending downwardly and rearwardly, and being pivotally connected to the upper end of a link extending downwardly through a slot in the base plate with its lower end pivoted to the closure plate; and a cable extending from said first arm of the bell crank lever across the silo roof and down the side of the silo and adapted to be locked when the cable is drawn taut, thereby maintaining the closure plate in operative position.

2. In a filling lid as set forth in claim 1, said hopper being substantially rectangular in plan, and having a relatively high rear wall, and a relatively low front wall sloping upwardly and outwardly, and side walls connecting said front and rear walls; and a rocker shaft journaled in the side walls adjacent the top of the rear wall forming a pivot for the said bell crank lever.

3. In a filling lid as set forth in claim 1, said other arm of the bell crank lever substantially underlying the said link in alignment therewith when the closure plate is in operative position.

*4. A filling lid for substantially sealed silos comprising, a base member assembled with an animal feed inlet in the upper end of the silo and having an opening therethrough registering with said inlet, a filling hopper supported on said base member over said opening and inlet and being open at the top to receive the usual gooseneck of a forage blower, a closure plate hingedly mounted on the underside of the base member and adapted to be pivoted outwardly to cover said opening in an airtight manner and to be pivoted inwardly to open said opening, a lever arm pivotally connected to the hopper at the upper end and extending through a slot adjacent said opening and pivotally connected at the lower end to the closure plate, and means connected to the lever arm and actuated from the base of the silo to pivot the lever arm to effect the actuation of the closure plate to the open or closed position with respect to said opening.*

* * * * *

UNITED STATES PATENT AND TRADEMARK OFFICE

CERTIFICATE OF CORRECTION

PATENT NO. : Re. 28,755

DATED : April 6, 1976

INVENTOR(S) : Sanford L. Hege

It is certified that error appears in the above-identified patent and that said Letters Patent are hereby corrected as shown below:

| | | |
|---|---|---|
| Column 2, Line 8, | Cancel "agngle" and substitute therefor ---angle---; |
| Column 2, Line 47, | Cancel "silt" and substitute therefor ---silo---; |
| Column 3, Line 15, | Cancel "pening" and substitute therefor ---opening---; |
| Column 3, Line 16, | Cancel "plane" and substitute therefor ---plate--- |

Signed and Sealed this

Twenty-first Day of September 1976

[SEAL]

*Attest:*

RUTH C. MASON
*Attesting Officer*

C. MARSHALL DANN
*Commissioner of Patents and Trademarks*